US007031466B2

(12) United States Patent
Lu et al.

(10) Patent No.: US 7,031,466 B2
(45) Date of Patent: Apr. 18, 2006

(54) HINGE POSITIONING APPARATUS FOR A FOLDABLE MOBILE TELEPHONE

(75) Inventors: Sheng-Nan Lu, Taipei Hsien (TW); Hsiang-Chi Chien, Taipei Hsien (TW)

(73) Assignee: Shin Zu Shing Co., Ltd., (TW)

( * ) Notice: Subject to any disclaimer, the term of this patent is extended or adjusted under 35 U.S.C. 154(b) by 442 days.

(21) Appl. No.: 10/412,266

(22) Filed: Apr. 14, 2003

(65) Prior Publication Data
US 2004/0202314 A1    Oct. 14, 2004

(51) Int. Cl.
*H04M 1/00* (2006.01)

(52) U.S. Cl. .............................. 379/433.13; 455/575.4; 16/303; 16/330

(58) Field of Classification Search ........... 379/433.13; 455/575.4; 16/303, 330
See application file for complete search history.

(56) References Cited

U.S. PATENT DOCUMENTS 6,148,480 A * 11/2000 Cooke ......................... 16/303
6,766,181 B1 * 7/2004 Newman et al. ......... 455/575.3

* cited by examiner

*Primary Examiner*—Ahmad F. Matar
*Assistant Examiner*—Quynh H. Nguyen
(74) *Attorney, Agent, or Firm*—Bacon & Thomas, PLLC (57) ABSTRACT

A hinge positioning apparatus for a foldable mobile telephone has a shaft, a set angle device and a biasing member. A washer is mounted on one end of the shaft. The set angle device has a stationary sleeve with a concave groove and a retractable sleeve with a convex ridge. The convex groove of stationary sleeve is rotatably attached to the concave ridge of the retractable surface. The biasing member is mounted around the shaft and mounted between the retractable sleeve and the washer. With such a hinge positioning apparatus, the hinge positioning apparatus can be used for an extended life without permanently deforming the biasing member inside the hinge positioning apparatus.

8 Claims, 9 Drawing Sheets

HINGE POSITIONING APPARATUS FOR A FOLDABLE MOBILE TELEPHONE

BACKGROUND OF THE INVENTION

1. Field of the Invention

The present invention relates to a hinge positioning apparatus for a foldable mobile telephone, and the hinge positioning apparatus has an advantage of being able to set an angle of the mobile telephone display with respect to the mobile telephone keypad.

2. Description of Related Art

Figure 15:
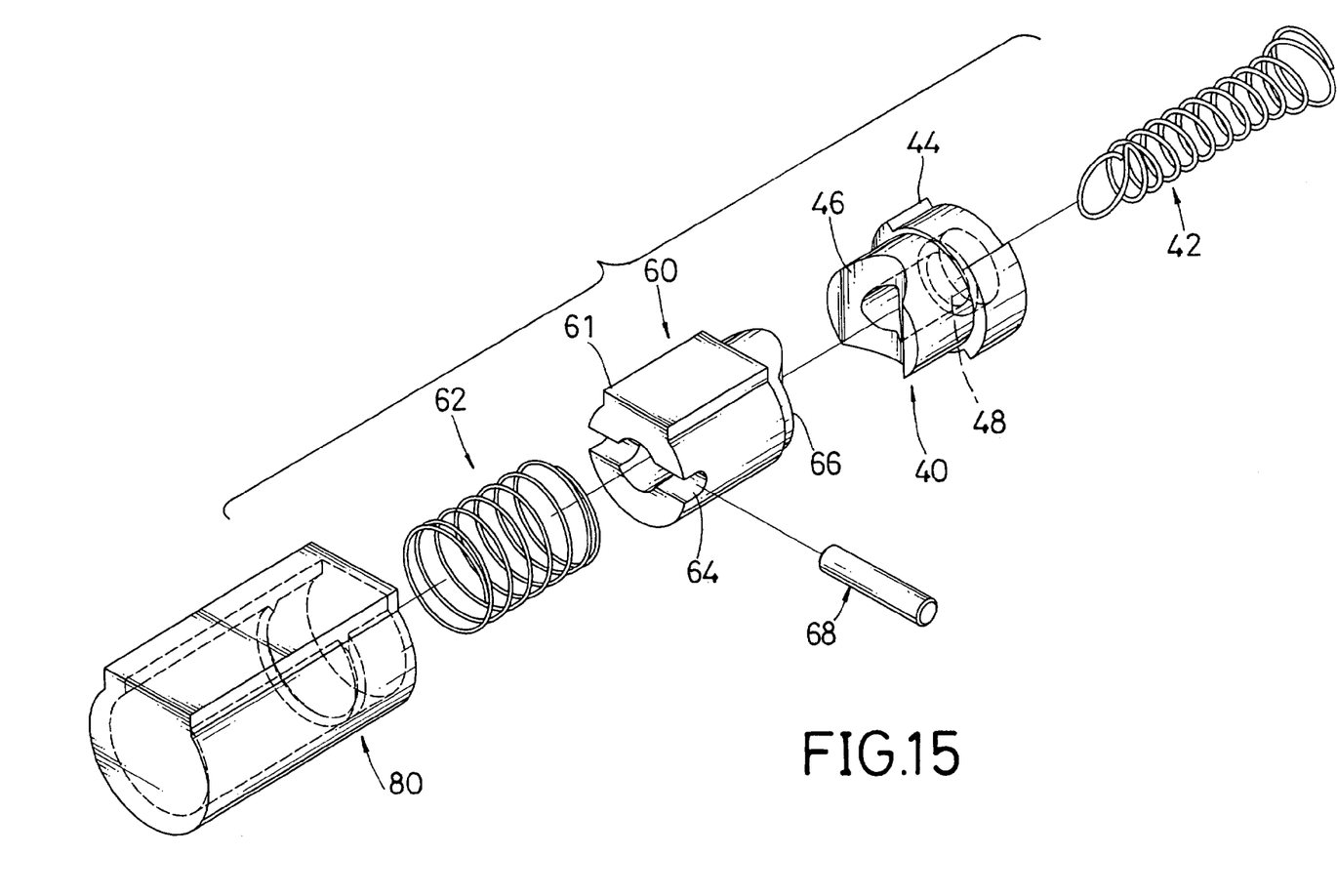
FIG. 15 is a conventional hinge positioning apparatus for a foldable mobile telephone in accordance with the prior art.

With reference to FIG. 15, a conventional hinge assembly comprises a hinge barrel (80), a stationary sleeve (60), a retractable sleeve (40), a compression spring (62), a sleeve spring (42) and a pin (68). The hinge barrel (80) has a closed end (not numbered) and an open end (not numbered). The rotating sleeve (60) has a slotted end (not numbered) and a convex end (not numbered) and is mounted inside the hinge barrel with the slotted end toward the closed end of the hinge barrel (80). The compression spring (62) is rotatably mounted inside the hinge barrel (80) between the closed end of the hinge barrel (80) and the slotted end of the stationary sleeve (60). The sleeve spring (42) is rotatably mounted in the open end of the hinge barrel (80), and the retractable sleeve (40) is mounted inside the hinge barrel away from the open end.

The rotating sleeve (60) has an axial through hole (not numbered), an axial exterior surface (not numbered), a convex protrusion (66) formed on the convex end and a transverse slot (64) formed in the slotted end. A key (61) is formed on the exterior surface of the rotating sleeve (60), and a pin (68) is mounted in the transverse slot (64) in the rotating sleeve (60).

The retractable sleeve (40) has an axial through hole (not numbered), an axial exterior surface (not numbered), a concave end (not numbered), a flat end (not numbered), a transverse concave depression (46) and an annular recess (48). The transverse concave depression (46) is formed in the concave end. The annular recess (48) is formed around the axial through hole at the flat end. An annular notch (44) is formed on the exterior surface of the stationary sleeve (40) around the flat end. The retractable sleeve (40) is securely mounted in the cover of the foldable mobile telephone.

The sleeve spring (42) has a fixed end (not numbered) and a free end (not numbered). A connecting ring (not numbered) is formed on the fixed end, and the free end is enlarged to fit in the recess in the flat end of the retractable sleeve (40). The sleeve spring (42) is mounted through the axial through holes in the stationary sleeve (40) and the rotating sleeve (60). The mounting ring is aligned with the transverse slot (64) in the rotating sleeve (60) and held in place by the pin (68). The sleeve spring (42) is stretched between the annular recess (48) in the stationary sleeve (40) and the pin (68) in the transverse slot (64) in the stationary sleeve (60). The convex protrusion (66) on the stationary sleeve (60) is rotatably mounted in the concave depression (46) in the retractable sleeve (40).

When the mobile telephone cover is opened with respect to the keypad, the hinge assembly rotates with the cover and controls the degree to which the cover is open. The annular notch (44) in the stationary sleeve (40) is securely mounted in the cover. When the stationary sleeve (40) rotates, the concave depression (46) in the stationary sleeve (40) pushes the convex protrusion (66) on the rotating sleeve (60) into the hinge barrel (80), compresses the compression spring (62) and stretches the sleeve spring (42). When the concave depression (46) passes the highest point of the convex protrusion (66), a restitution force created in the sleeve spring (42) causes the concave depression (46) to continue to rotate and mate with the convex protrusion (66) at a point where the cover is 180° from the closed position. Repeated openings of the mobile telephone cover will likely result in permanent deformation of the sleeve spring (42).

To overcome the shortcomings, the present invention provides an improved device to hold a foldable mobile telephone open or closed to mitigate and obviate the aforementioned problems.

SUMMARY OF THE INVENTION

The primary objective of the present invention is to provide an improved hinge positioning apparatus for a foldable mobile telephone, so the hinge positioning apparatus can be used for an extended life without permanently deforming the biasing member inside the hinge positioning apparatus.

To accomplish the foregoing objective, a set angle device with a biasing member is used to control the extent that the display opens with respective to the keypad of the foldable mobile telephone.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
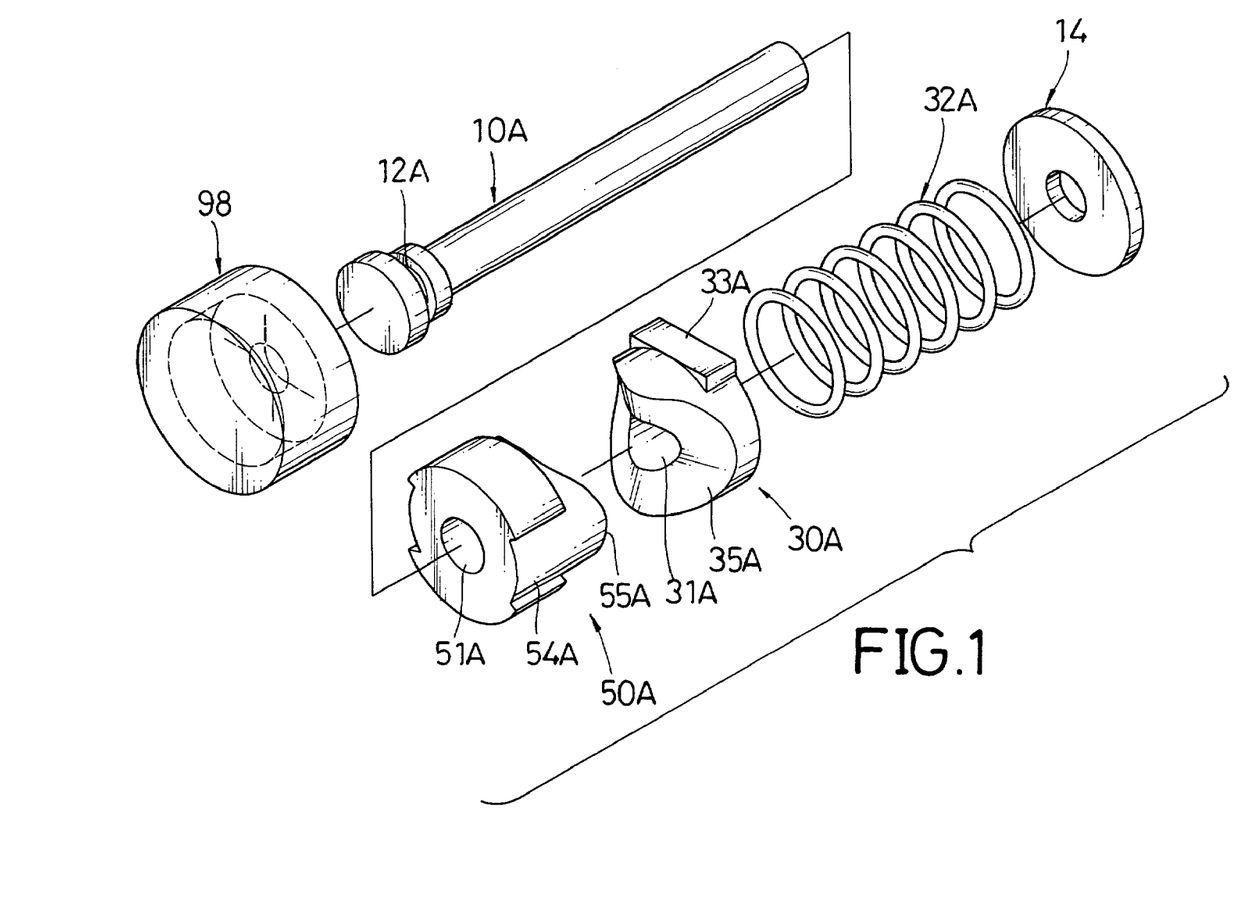
FIG. 1 is an exploded perspective view of a first embodiment of a hinge positioning apparatus for a foldable mobile telephone in accordance with the present invention.
Figure 14:
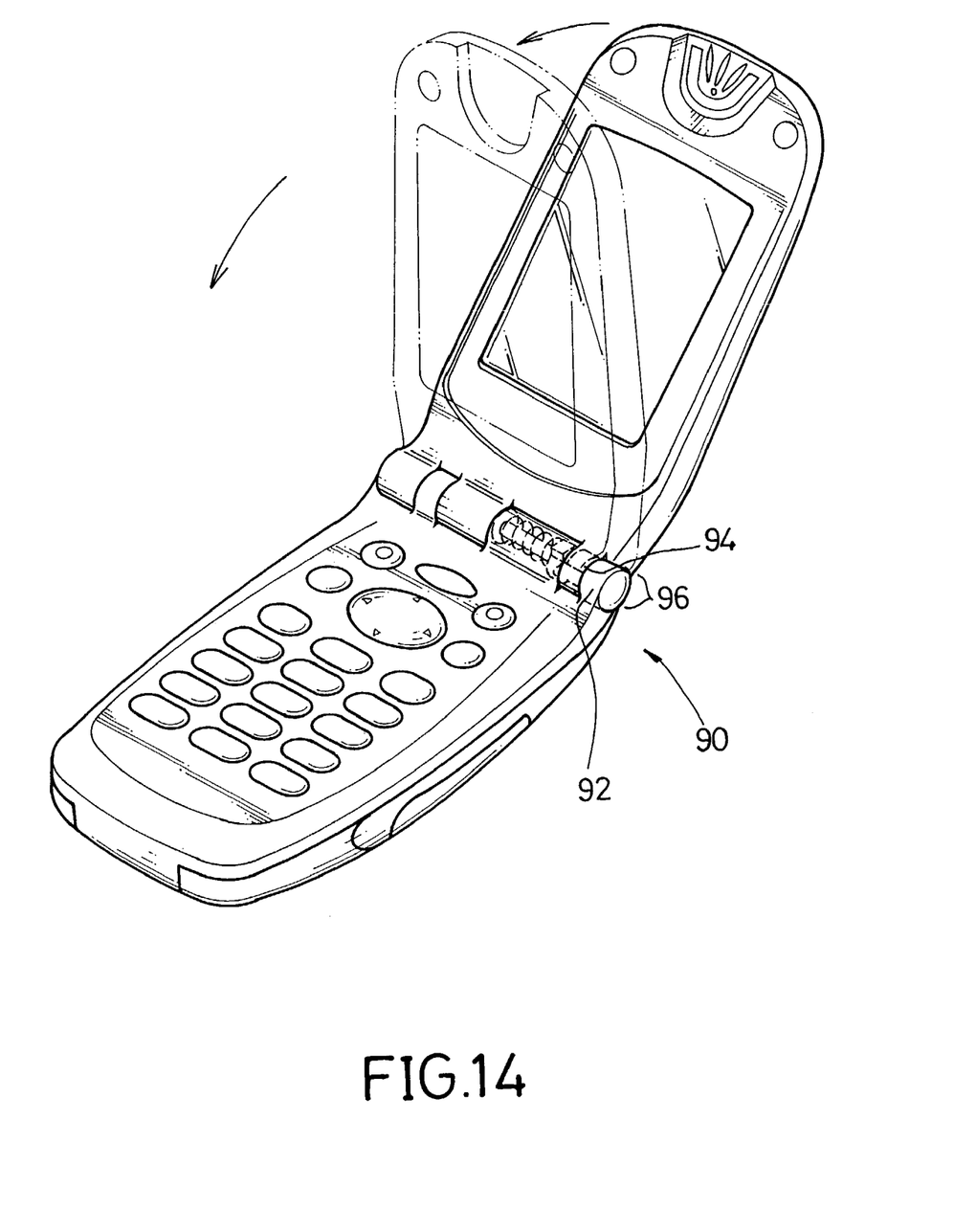
FIG. 14 is a perspective view of a hinge positioning apparatus for a mobile telephone in accordance with the present invention mounted in a mobile telephone.

With reference to FIGS. 1 and 14, a first embodiment of a hinge positioning apparatus for a foldable mobile telephone (90) comprises a cap (98), a washer (14), a cylindrical shaft (10A), a set angle device (not numbered) and a biasing member (not numbered).

The foldable mobile telephone (90) has a hinge assembly comprising a cover (not numbered), a body (not numbered) and a hinge barrel (96). The hinge barrel (96) comprises two ends, a hinge pin (not numbered), a hinge positioning apparatus (not numbered), cover hinge knuckles (94) extended from the cover and a body hinge knuckles (92) extended from the body. The hinge barrel (96) comprises five knuckles from the cover hinge knuckles (94) and the body hinge knuckles (92). The cover hinge knuckles (94) comprise a central knuckle, a hinge pin knuckle and a hinge positioning end knuckle. The body hinge knuckles (92) comprises a hollow knuckle and a hinge-positioning knuckle. The barrel (96) has one end with the hinge pin knuckle and the other end with the hinge positioning end knuckle.

A display (not numbered) is securely mounted in the cover and a keypad (not numbered) is securely mounted in body. The hinge pin is rotatably mounted inside hinge pin knuckle in one end of the hinge barrel (96), and the hinge positioning apparatus is rotatably mounted inside hinge positioning end knuckle of the other end of the hinge barrel (96).

Figure 2:
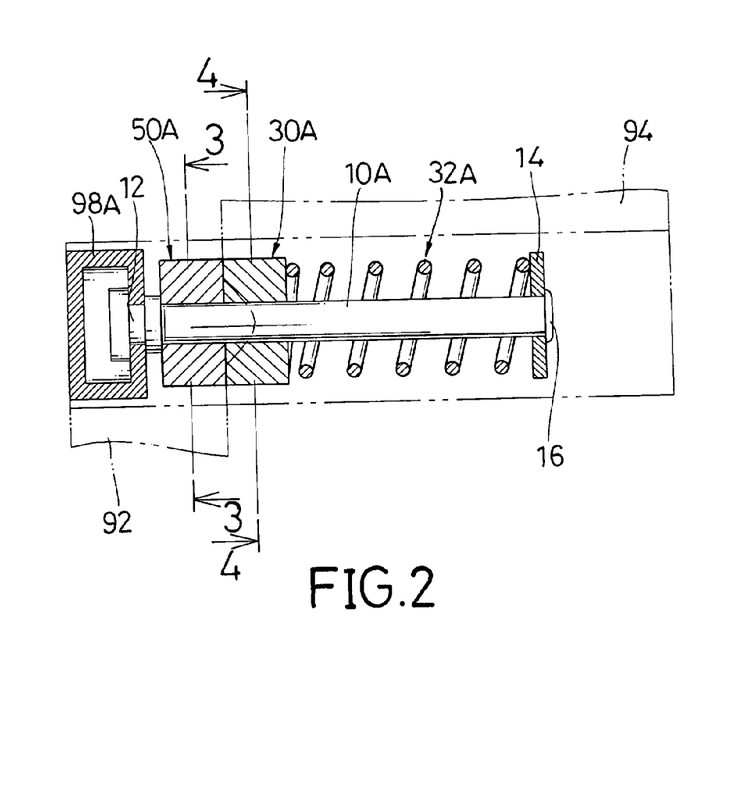
FIG. 2 is a cross sectional front plan view of the hinge positioning apparatus in FIG. 1.

With further reference to FIG. 2, the cylindrical shaft (10A) has two ends (not numbered) and an annular neck (12A). The annular neck (12A) is formed at one end on the shaft (10A) and is rotatably mounted in the cap (98), so the annular neck (12A) is adapted to be mounted in the body hinge knuckles (92) of the hinge barrel (96). The washer (14) is mounted around the other end of the cylindrical shaft (10A), and that end of the cylindrical shaft (10A) has a flange (16) to hold the washer (14) on the shaft (10A).

The set angle device (not numbered) comprises a stationary sleeve (50A) and a retractable sleeve (30A). The stationary sleeve (50A) is a cylinder and has an axial hole (51A), a contact end (not numbered), a flat end (not numbered) and an outer cylindrical surface (not numbered). The contact end has a transverse concave groove (55A). The retractable sleeve (30A) is a cylinder and has an axial hole (31A), a contact end (not numbered), a flat end (not numbered) and an outer cylindrical surface (not numbered). The contact end has a transverse convex ridge (35A) corresponding to the transverse concave groove (55A) on the stationary sleeve (50A) The convex ridge (35A) of the retractable sleeve (30A) rotatably abuts the concave groove (55A) on the stationary sleeve (50A). The stationary sleeve (50A) and the retractable sleeve (30A) are mounted on the cylindrical shaft (10A) that extends through the axial holes (51A,31A). The flat end of the stationary sleeve (50A) abuts the end of the cylindrical shaft (10A) with the annular neck (12A), and the contact end of the retractable sleeve (30A) abuts the contact end of the stationary sleeve (50A). Two notches (54A) are formed on the outer exterior surface of the stationary sleeve (50A). A key (33A) is formed on the outer exterior surface of the retractable sleeve (30A).

The biasing member (not numbered) comprises a spiral spring (32A), and the spiral spring is compressibly mounted around the cylindrical shaft (10A) between the retractable sleeve (30A) and the washer (14) in a cover hinge knuckle (94) of the hinge barrel (96).

Figure 3:
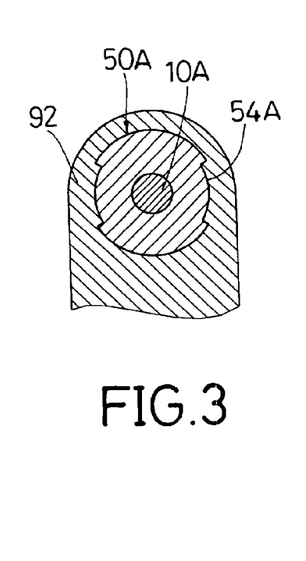
FIG. 3 is a cross sectional side plan view of the hinge positioning apparatus along line 3—3 in FIG. 2.
Figure 4:
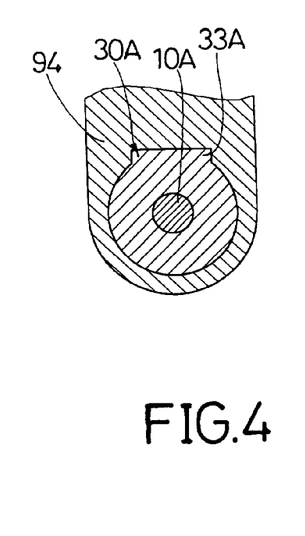
FIG. 4 is a cross sectional side plan view of the hinge positioning apparatus along line 4—4 in FIG. 2.

With reference to FIGS. 3 and 4, the two notches (54A) of the stationary sleeve (50A) are securely mounted in a body hinge knuckle (92) of the hinge barrel (96). The key (33A) of the retractable sleeve (30A) is slidably mounted in a cover hinge knuckle (94) of hinge barrel (96).

The cover hinge knuckles (94) of the hinge barrel (96) rotate relative to the body hinge knuckles (92) to open the cover. When the retractable sleeve (30A) rotates with the cover hinge knuckles (94), the retractable sleeve (30A) is pushed into the cover hinge knuckles (94) by the concave groove (55A) in the stationary sleeve (50A) interacting with and pressing against the convex ridge (35A) on the retractable sleeve (30A). When the retractable sleeve (30A) rotates with respect to the stationary sleeve (50A), the concave ridge (35A) in the retractable sleeve (30A) first separates from the concave groove (SSA) in the stationary sleeve (50A) and compresses the spiral spring (32A) and generates a restitution force in the spiral spring (32A). As high points of the convex ridge (35A) and the concave groove (55A) pass each other, the restitution force in the spiral spring (32A) press the retractable sleeve (30A) back into the stationary sleeve (50A), and the cover is held open at a position 180° relative to the body.

Figure 5:
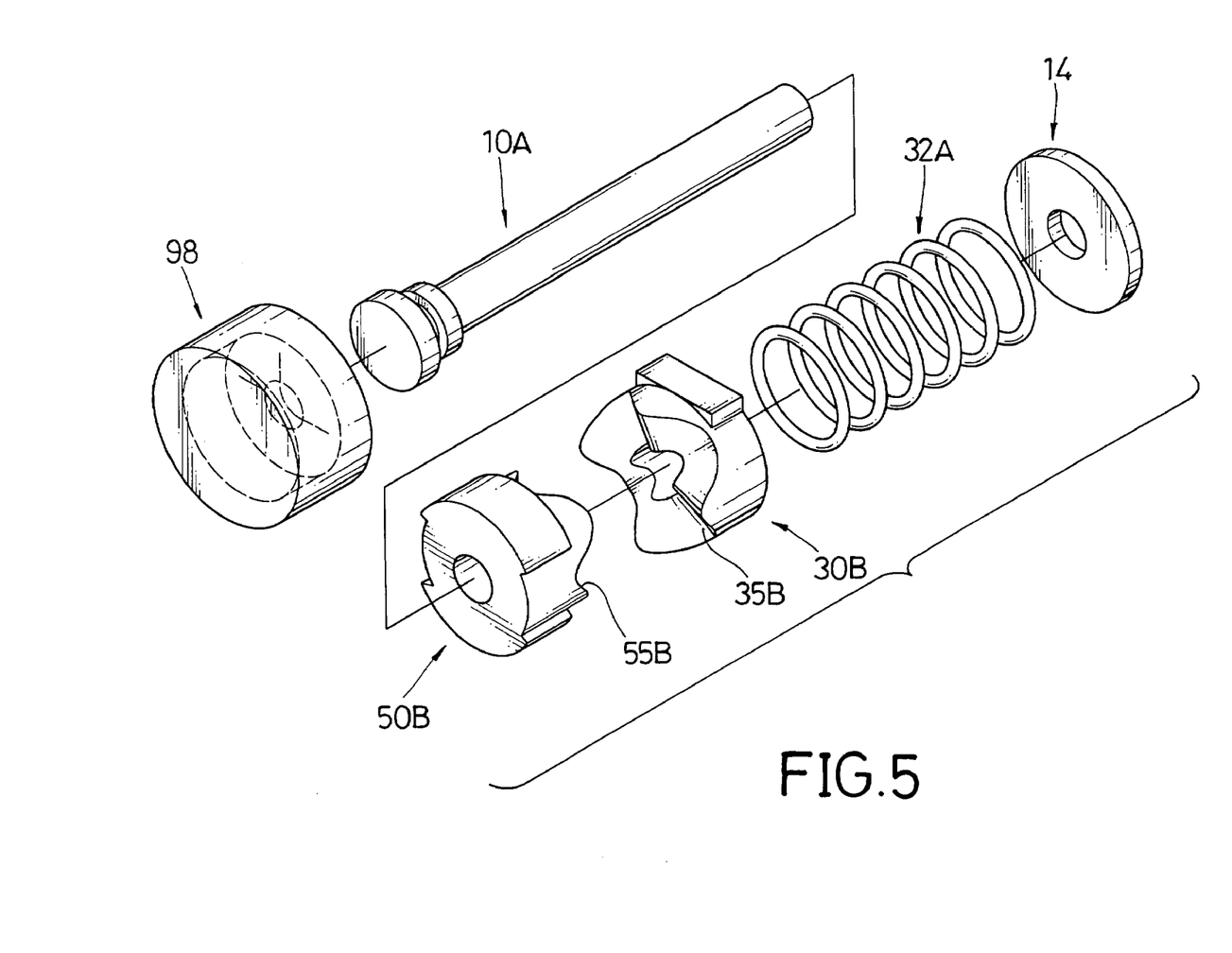
FIG. 5 is an exploded perspective view of a second embodiment of the hinge positioning apparatus for a foldable mobile telephone in accordance with the present invention.

With reference to FIG. 5, a second embodiment of the hinge positioning apparatus for a foldable mobile telephone allows the cover of the foldable mobile phone to be opened to an intermediate position. The second embodiment of the hinge positioning apparatus is the same as the first embodiment except the contact end of the stationary sleeve (50B) has two concave grooves (55B) and the contact end of the retractable sleeve (30B) has two convex ridges (35B) corresponding to the contact end of the concave grooves (55B). When one pair of concavity exists on the concave surfaces (35B, 55B), the display is opened 180 degree with respect to the keypad of the foldable mobile telephone (90). When two pairs of concavities exist on the concave surfaces (35B, 55B) of the retractable and the stationary sleeves (30B, 50B), the display is opened 90 degree with respect to the keypad of the foldable mobile telephone (90).

Figure 6:
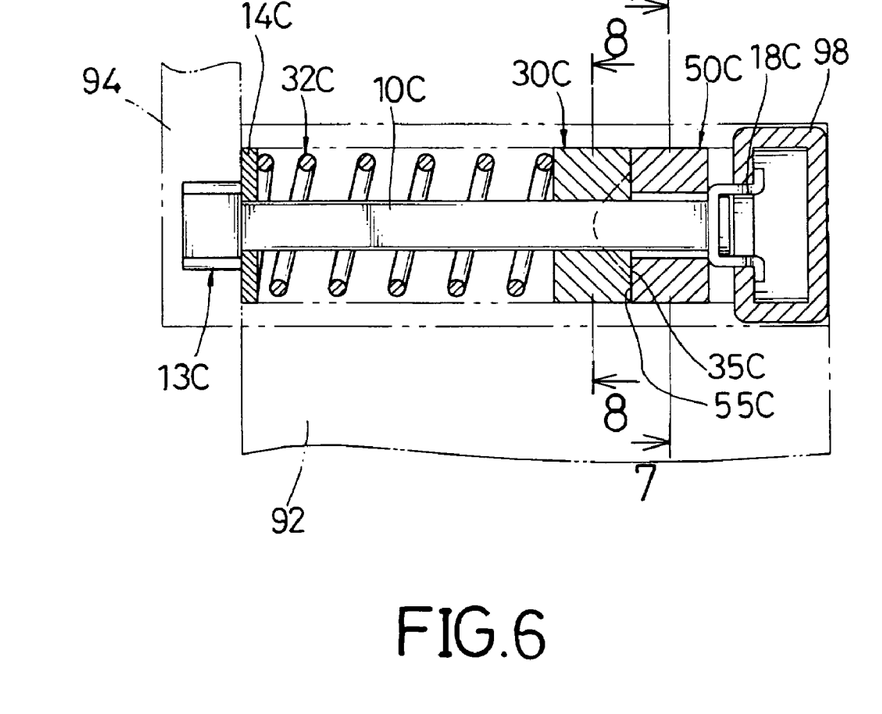
FIG. 6 is a cross sectional front plan view of a third embodiment of the hinge positioning apparatus in accordance with the present invention.
Figure 7:
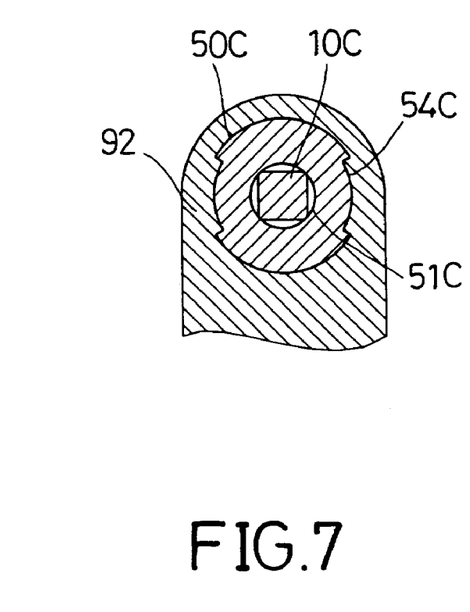
FIG. 7 is a cross sectional side plan view of the hinge positioning apparatus along line 7—7 in FIG. 6.
Figure 8:
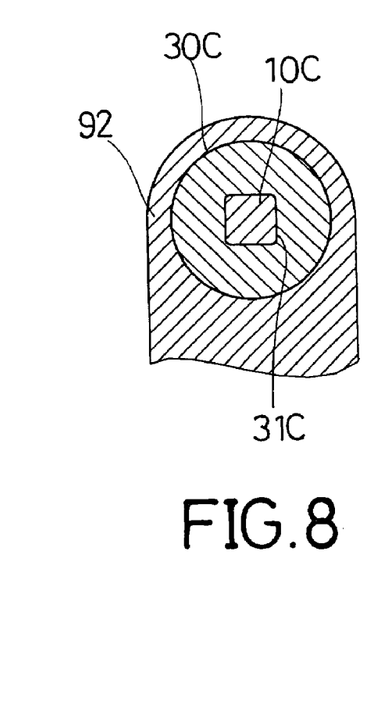
FIG. 8 is a cross sectional side plan view of the hinge positioning apparatus along line 8—8 in FIG. 6.

With reference to FIGS. 6 to 8, a third embodiment of a hinge positioning apparatus for a foldable mobile telephone comprises a hinge barrel (96), a square shaft (10C), a set angle device (not numbered), and a biasing member (not numbered).

The square shaft (10C) is adapted to be mounted in a cover hinge knuckle (94) of the hinge barrel (96), and the square shaft (10C) has two ends (not numbered). A connecting square (13C), which is formed at one end on the shaft, is securely mounted in the cover hinge knuckles (94) of the hinge barrel (96). A washer (14C) is extended through the square shaft (10C) and mounted next to the connecting square (13C). A clamping device (18C) is capped and clamped at the other end of the square shaft (10C) to secure the set angle device and the biasing member (32C) extended through the square shaft (10C).

The set angle device (not numbered) is extended through the square shaft (10C) by the central hole (31C, 51C). The set angle device comprises a stationary sleeve (50C) with a concave surface (55C) and a retractable sleeve (30C) with a concave surface (35C). The concave surface (SSC) of the stationary sleeve (50C) is rotatably attached to the concave surface (35C) of the retractable sleeve (30C), and the retractable sleeve (30C) is extended through the shaft (10C) away from the connecting square (13C). The rotating device (50C) has an outer exterior surface (not numbered) and two notches (54C) are formed on the outer exterior surface of the stationary sleeve (50C).

The set angle device (not numbered) comprises a stationary sleeve (50C) and a retractable sleeve (30C). The stationary sleeve (50C) is a cylinder and has an axial hole (51C), a contact end (not numbered), a flat end (not numbered) and an outer cylindrical surface (not numbered). The contact end has a transverse concave groove (55C). The retractable sleeve (30C) is a cylinder and has an axial hole (31C), a contact end (not numbered), a flat end (not numbered) and an outer cylindrical surface (not numbered). The contact end has a transverse convex ridge (35C) corresponding to the transverse concave groove (55C) on the stationary sleeve (50C) The convex ridge (35C) of the retractable sleeve (30C) rotatably abuts the concave groove (55C) on the stationary sleeve (50C). The stationary sleeve (50C) and the retractable sleeve (30C) are mounted on the shaft (10C) that extends through the axial holes (31C,51C). The flat end of the stationary sleeve (50C) abuts the clamping device (18C) on the shaft (10C), and the contact end of the retractable sleeve (30C) abuts the contact end of the stationary sleeve (50C). Two notches (54C) are formed on the outer exterior surface of the stationary sleeve (50C).

The biasing member (not numbered) comprises a spiral spring (32C), and the spiral spring (32C) is compressibly mounted around the square shaft (10C) between the retractable sleeve (30C) and the washer (14C).

The two notches (54C) of the stationary sleeve (50C) are securely mounted in a body hinge knuckle (92) of the hinge barrel (96). The retractable sleeve (30C) is securely mounted on the square shaft (10C) and rotatably mounted in a body hinge knuckle (92) of hinge barrel (96).

The cover hinge knuckles (94) of the hinge barrel (96) rotate relative to the body hinge knuckles (92) to open the cover. When the retractable sleeve (30C) rotates with the cover hinge knuckles (94), the retractable sleeve (30C) is pushed into the cover hinge knuckles (94) by the concave groove (55C) in the stationary sleeve (50C) interacting with and pressing against the convex ridge (35C) on the retractable sleeve (30C). When the retractable sleeve (30C) rotates with respect to the stationary sleeve (50C), the concave ridge (35C) in the retractable sleeve (30C) first separates from the concave groove (55C) in the stationary sleeve (50C) and compresses the spiral spring (32C) and generates a restitution force in the spiral spring (32C). As high points of the convex ridge (35C) and the concave groove (55C) pass each other, the restitution force in the spiral spring (32C) press the retractable sleeve (30C) back into the stationary sleeve (50C), and the cover is held open at a position 180° relative to the body.

Figure 9:
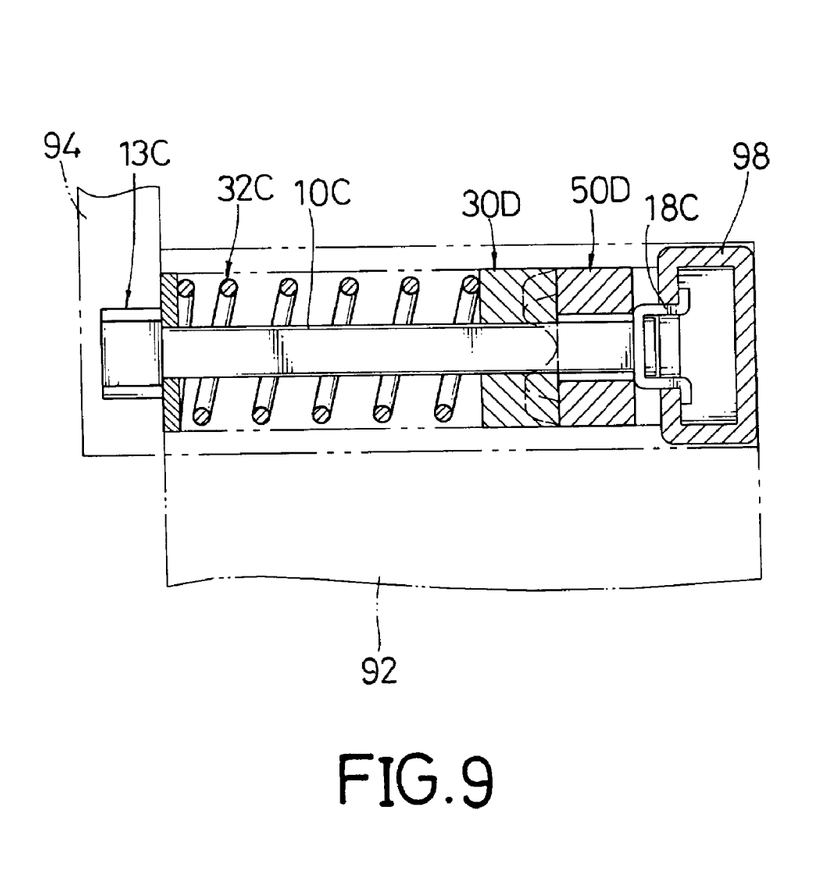
FIG. 9 is a cross sectional front plan view of a fourth embodiment of the hinge positioning apparatus for a foldable mobile telephone in accordance with the present invention.

With reference to FIG. 9, a fourth embodiment of the hinge positioning apparatus for a foldable mobile telephone allows the cover of the foldable mobile phone to be opened to an intermediate position. The fourth embodiment of the hinge positioning apparatus is the same as the first embodiment except the contact end of the stationary sleeve (50D) has two concave grooves (not numbered) and the contact end of the retractable sleeve (30D) has two convex ridges (not numbered) corresponding to the contact end of the concave grooves. When one pair of concavity exists on the concave surfaces, the display is opened 180 degree with respect to the keypad of the foldable mobile telephone (90).

When two pairs of concavities exist on the concave surfaces of the retractable and the stationary sleeves (30D, 50D), the display is opened 90 degree with respect to the keypad of the foldable mobile telephone (90).

Figure 10:
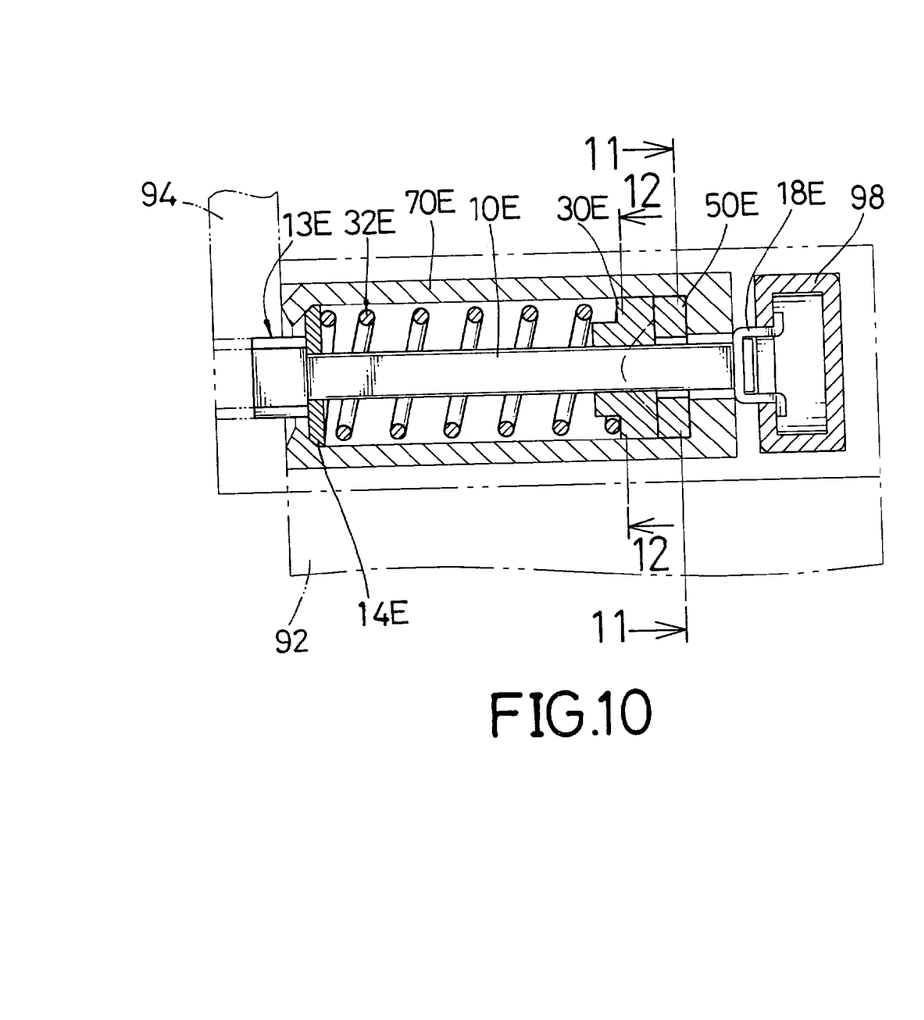
FIG. 10 is a cross sectional front plan view of a fifth embodiment of the hinge positioning apparatus for a mobile telephone in accordance with the present invention.
Figure 11:
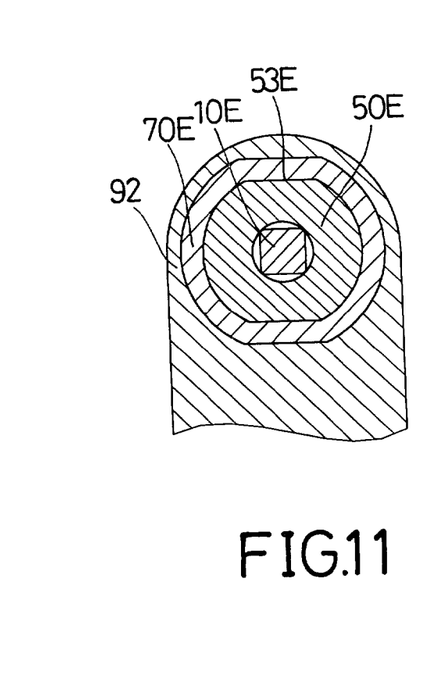
FIG. 11 is a cross sectional side plan view of the hinge positioning apparatus in along line 11—11 in FIG. 10.

With reference to FIGS. 10 to 11, a fifth embodiment of a hinge positioning apparatus for a foldable mobile telephone comprises a hinge barrel (96), a shaft barrel (70E), a square shaft (10E), a set angle device (not numbered), and an biasing member (not numbered).

The square shaft (10E) is adapted to be mounted in the cover hinge knuckles (94) of the hinge barrel (96), and the square shaft (10E) has two ends (not numbered). A connecting square (13E), which is formed at one end on the shaft, is securely mounted in the cover hinge knuckles (94) of the hinge barrel (96). A washer (14E) is extended through the square shaft (10E) and mounted next to the connecting square (13E). A clamping device (18E) is capped and clamped at the other end of the square shaft (10E) to secure the set angle device and the biasing member extended through the square shaft (10E).

The shaft barrel (70E) is mounted in the hinge barrel (96), and the square shaft (10E) with the set angle device and the biasing member are mounted in the shaft barrel (70E).

The set angle device (not numbered) comprises a stationary sleeve (50E) and a retractable sleeve (30E). The stationary sleeve (50E) is a cylinder and has an axial hole (not numbered), a contact end (not numbered), a flat end (not numbered) and an outer cylindrical surface (not numbered). The contact end has a transverse concave groove (not numbered). The retractable sleeve (30E) is a cylinder and has an axial hole (not numbered), a contact end (not numbered), a flat end (not numbered) and an outer cylindrical surface (not numbered). The contact end has a transverse convex ridge (not numbered) corresponding to the transverse concave groove on the stationary sleeve (50E) The convex ridge of the retractable sleeve (30E) rotatably abuts the concave groove on the stationary sleeve (50E). The stationary sleeve (50E) and the retractable sleeve (30E) are mounted on the shaft (10E) that extends through the axial holes. The flat end of the stationary sleeve (50E) abuts the clamping device (18E) on the shaft (10E), and the contact end of the retractable sleeve (30E) abuts the contact end of the stationary sleeve (50E). Two flat surfaces (53E) are formed on the outer exterior surface of the stationary sleeve (50E).

Figure 12:
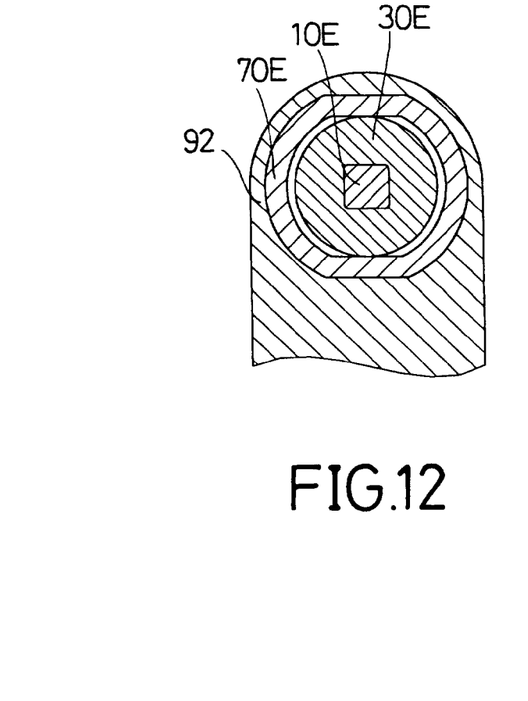
FIG. 12 is a cross sectional side plan view of the hinge positioning apparatus in along line 12—12 in FIG. 10.

The two flat surfaces (53E) of the stationary sleeve (50E) are securely mounted in the shaft sleeve (70E) that is received in a body hinge knuckles (92) of the hinge barrel (96), such that the stationary sleeve (50E) will rotate with the shaft sleeve (70E). The retractable sleeve (30E) is mounted in the shaft sleeve (70E), and a gap (not numbered) is formed between the outer exterior surface of the retractable sleeve (30E) and the shaft sleeve (70E). With the arrangement of the gap, the retractable sleeve (30E) will rotate relative to the shaft sleeve (70E).

The biasing member (not numbered) comprises a spiral spring (32E), and the spiral spring (32E) is compressibly mounted around the square shaft (10E) between the retractable sleeve (30E) and the washer (14E).

The cover hinge knuckles (94) of the hinge barrel (96) rotate relative to the body hinge knuckles (92) to open the cover. When the retractable sleeve (30E) rotates with the shaft sleeve (70E) and the cover hinge knuckles (94), the retractable sleeve (30E) is pushed into the cover hinge knuckles (94) by the concave groove in the stationary sleeve (50E) interacting with and pressing against the convex ridge on the retractable sleeve (30E). When the retractable sleeve (30E) rotates with respect to the stationary sleeve (50E), the concave ridge in the retractable sleeve (30E) first separates from the concave groove in the stationary sleeve (50B) and compresses the spiral spring (32E) and generates a restitution force in the spiral spring (32E). As high points of the convex ridge and the concave groove pass each other, the restitution force in the spiral spring (32E) press the retractable sleeve (30E) back into the stationary sleeve (50E), and the cover is held open at a position 180° relative to the body.

Figure 13:
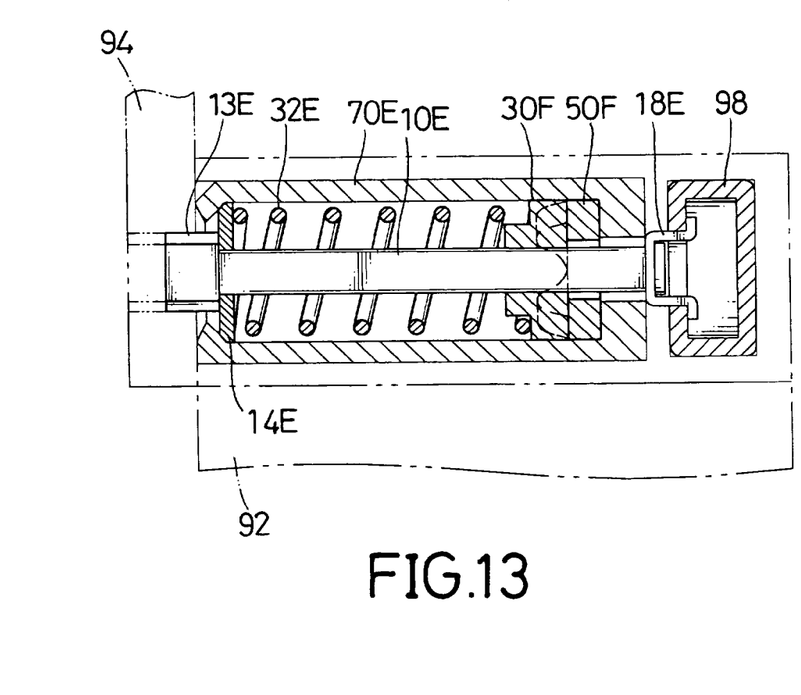
FIG. 13 is a front view of a sixth embodiment of the hinge positioning apparatus for a foldable mobile telephone in accordance with the present invention.

With reference to FIG. 13, a sixth embodiment of the hinge positioning apparatus for a foldable mobile telephone allows the cover of the foldable mobile phone to be opened to an intermediate position. The fourth embodiment of the hinge positioning apparatus is the same as the first embodiment except the contact end of the stationary sleeve (50F) has two concave grooves (not numbered) and the contact end of the retractable sleeve (30F) has two convex ridges (not numbered) corresponding to the contact end of the concave grooves (55F). When one pair of concavity exists on the concave surfaces, the display is opened 180 degree with respect to the keypad of the foldable mobile telephone (90). When two pairs of concavities exist on the concave surfaces (35F, 55F) of the retractable and the stationary sleeves (30F, 50F), the display is opened 90 degree with respect to the keypad of the foldable mobile telephone (90).

The advantage of this invention is that the hinge positioning apparatus automatically sets display opening degree with respect to the keypad for the foldable mobile telephone. Moreover, the spiral spring is used with long life period when the spiral spring is not constantly stretched with the display opened. Third, use one spring instead of two springs save money in processing the hinge positioning apparatus for a foldable mobile telephone.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge positioning apparatus for a foldable mobile telephone having a hinge barrel with cover hinge knuckles and body hinge knuckles, the hinge positioning apparatus comprising:
  a shaft adapted to be mounted in the body hinge knuckles of the hinge barrel;
  a washer mounted around the shaft at one end of the shaft the deformed end and the deformed end held the washer;
  a set angle device mounted around the shaft and adapted to be mounted in the hinge barrel, and the set angle device comprising:
    a stationary sleeve with a central hole mounted around the shaft and adapted to be securely mounted in the body hinge knuckles of the hinge barrel, the stationary sleeve comprising:
      an outer periphery and one end; and
      at least one transverse concave groove formed on the one end of the stationary sleeve; and
    a retractable sleeve with a central hole mounted around the shaft and comprising:
      an outer periphery and one end; and
      a transverse convex ridge formed on the one end of the retractable sleeve and corresponding to and rotatably abutting each respective one of the at least one transverse concave groove on the stationary sleeve; and
  a biasing member mounted around the shaft and compressibly mounted between the retractable sleeve of the set angle device and the washer.

2. The hinge positioning apparatus for a foldable mobile telephone as claimed in claim 1, wherein the stationary sleeve has two transverse concave grooves; and
  the retractable has two transverse convex ridges to correspond to the transverse concave grooves on the stationary sleeve.

3. The hinge positioning apparatus for a foldable mobile telephone as claimed in claim 1, wherein the shaft is cylindrical.

4. The hinge positioning apparatus for a foldable mobile telephone as claimed in claim 1 further comprising a cap mounted on one end of the shaft away from the washer.

5. The hinge positioning apparatus for a foldable mobile telephone as claimed in claim 4, wherein the shaft has an annular neck formed on the end of the shaft away from the washer; and
  the cap is securely mounted in neck in the shaft.

6. The hinge positioning apparatus for a foldable mobile telephone as claimed in claim 4, wherein the shaft has a flange formed on one end of the shaft to hold the washer in place.

7. The hinge positioning apparatus for a foldable mobile telephone as claimed in claim 1, wherein the stationary sleeve has two notches formed on the outer periphery of the stationary sleeve.

8. The hinge positioning apparatus for a foldable mobile telephone as claimed in claim 1, wherein the biasing member comprising a spiral spring.

* * * * *